United States Patent [19]
Brambilla

[11] Patent Number: 4,875,736
[45] Date of Patent: Oct. 24, 1989

[54] METHOD FOR THE PRODUCTION OF MOTOR VEHICLE SEATS AND SEATS OBTAINED BY THIS METHOD

[75] Inventor: Silvio Brambilla, Grugliasco, Italy

[73] Assignee: SICAM S.p.A., Turin, Italy

[21] Appl. No.: 244,235

[22] Filed: Sep. 14, 1988

[30] Foreign Application Priority Data

Sep. 14, 1987 [IT] Italy ............................................ 67780

[51] Int. Cl.⁴ .................................................. A47C 7/00
[52] U.S. Cl. ...................................... 297/440; 29/469; 297/443
[58] Field of Search ............... 296/65.1; 297/440, 443, 297/355, 353; 29/469; 248/393

[56] References Cited

U.S. PATENT DOCUMENTS

| | | | |
|---|---|---|---|
| 4,285,544 | 8/1981 | Zapf | 297/440 |
| 4,395,011 | 7/1983 | Torta | 248/393 |
| 4,515,404 | 5/1985 | Nishinura et al. | 296/65.1 |
| 4,602,817 | 7/1986 | Raftery | 297/440 |
| 4,746,168 | 5/1988 | Bracesco | 297/443 |
| 4,761,036 | 8/1988 | Vogel | 297/440 |

Primary Examiner—James T. McCall
Attorney, Agent, or Firm—Sughrue, Mion, Zinn, Macpeak & Seas

[57] ABSTRACT

The structure of a motor vehicle seat is constituted by a plurality of modular sub-units which are put together and are each produced in various mutually interchangeable versions so as to enable efficient and economical production of various models of seat. Each vehicle seat includes a main frame having a longitudinal guide device and a backrest adjustment device, a squab frame having different adjustment features, a backrest frame having different adjustment features, a specific padding and a specific cover therefor.

5 Claims, 2 Drawing Sheets

METHOD FOR THE PRODUCTION OF MOTOR VEHICLE SEATS AND SEATS OBTAINED BY THIS METHOD

BACKGROUND OF THE INVENTION

The present invention relates to motor vehicle seats.

A motor vehicle seat, according to conventional technology, comprises an actual seat or squab, and a backrest, each having a frame on which is mounted a padding of expanded plastics material provided with an outer covering. A device for adjusting the inclination of the backrest is usually interposed in the connection between the frame of the squab and the frame of the backrest. The frame of squab is connected in its turn to the floor of the motor vehicle by means of a longitudinal guide device which enables the position of the seat to be adjusted longitudinally of the motor vehicle. In addition to the above basic components, the seat may have a plurality of further adjustment mechanisms, according to the type of motor vehicle and the performance required of the seat itself. For example, the squab may be provided with adjustment mechanisms such as a device for adjustment of the thigh support, a device for adjustment of the lateral thigh restraint (that is, for the adjustment of the side parts for lateral support of the thighs), as well as respective manual or motorised control devices. The backrest may also be provided with one or more adjustment mechanisms, such as, for example, a device for adjustment of the lumbar support, and a device for adjustment of the lateral restraint (that is, for adjustment of side parts of the lateral support of the body), as well as the respective manual or motorised control devices. The frame of the squab may also be provided with a device for adjusting the attitude of the seat, for example, to enable the height of the front edge and/or the rear edge of the squab to be varied.

By selecting and combining the above components in various ways, the seat manufacturer can thus provide a practically unlimited number of seat models, so as to satisfy the different possible requirements of the motor vehicle manufacturer.

SUMMARY OF THE INVENTION

The object of the present invention is to provide a method for the production of motor vehicle seats which on the one hand enables the low-cost production of a plurality of different seat models, and on the other hand enables the production of each new type of seat to be arranged in a very short time.

According to the invention, a plurality of modular seat sub-units are provided which can be put together in various ways to form a complete seat, the sub-units including in particular:

a first seat sub-unit constituted by a main frame provided with one or more seat-adjustment mechanisms, such as, for example, the longitudinal guide device, the backrest-adjustment device, the devices for adjustment of the attitude of the seat, and the respective manual or motorised control devices, a second sub-unit constituting the frame of the squab and possibly provided with one or more squab-adjustment mechanisms, such as the device for adjustment of the thigh support, the device for adjustment of the lateral thigh restraint, and the respective manual or motorised control devices, a third sub-unit constituting the frame of the backrest and possibly provided with one or more backrest-adjustment mechanisms, such as, for example, the device for adjustment of the lumber support, the device for adjustment of the lateral restraint, and the respective manual or motorised control devices, fourth and fifth sub-units constituted respectively by the padding of the squab and the padding of the backrest, with their respective outer coverings.

Still according to the invention, the above sub-units are provided with means for their mutual connection. For each of the sub-units, a plurality of different mutually interchangeable versions are provided, each of which has connection means which are compatible with the connection means of any other version of the other sub-units, so that the different versions of the various sub-units can be put together in different possible conbinations to produce a plurality of different seat models.

The seat manufacturer may thus arrange for the production of a series of seat models at a relatively low cost and is also in a position to respond promptly to any new requirement of the motor vehicle manufacturer for new types of seat.

A seat obtained by means of the above-described method is also a subject of the present invention.

BRIEF DESCRIPTION OF THE DRAWINGS

Further characteristics and advantages of the invention will become clear from the description which follows with reference to the appended drawings provided purely by way of non-limiting example, in which.

DETAILED DESCRIPTION OF THE INVENTION

Figure 1:
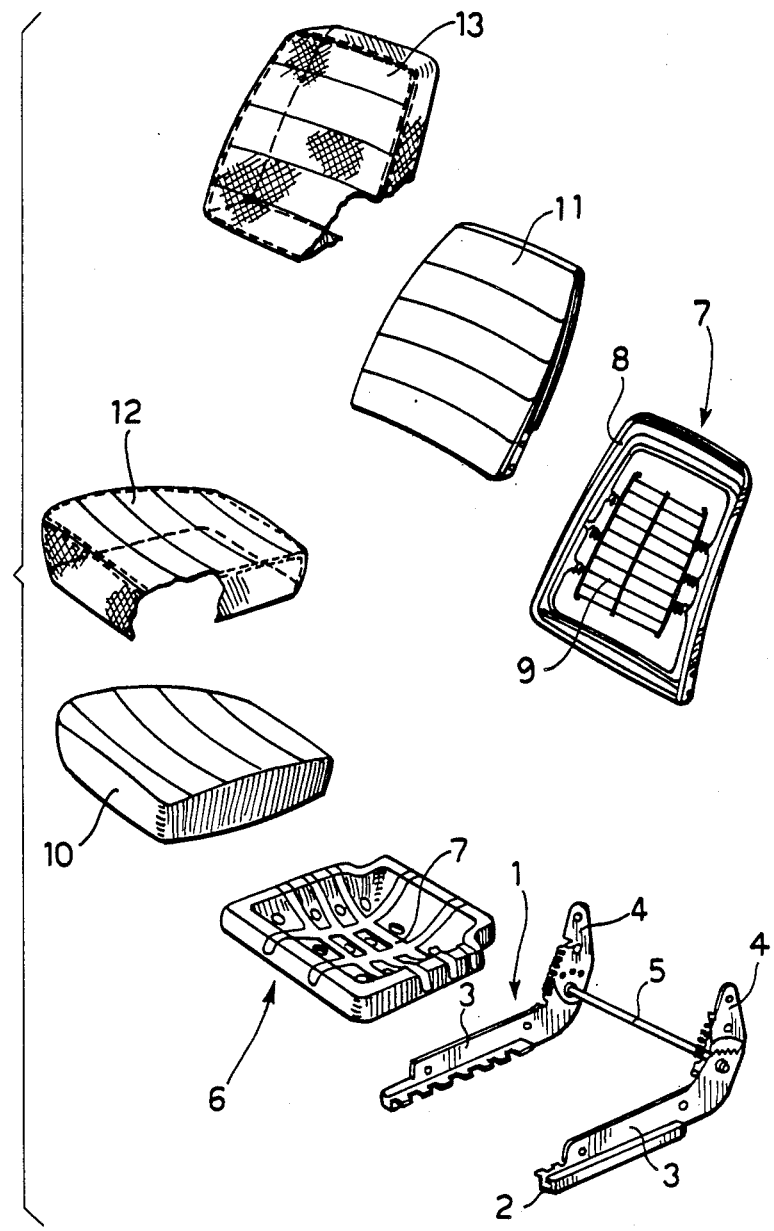
FIG. 1 shows one embodiment of a seat according to the invention.

In FIG. 1, a first modular sub-unit forming part of the structure of the seat is indicated 1 and incorporates the device for longitudinal guiding of the seat and the device for adjustment of the inclination of the backrest. The guide device is constituted, in the embodiment illustrated, by two guide profiles 2 intended to be fixed to the floor of the motor vehicle, and by two corresponding runners (not visible in the drawing) slidably mounted within the guides 2 and rigidly connected to two lateral structures 3 of the squab. The guide device is not described in detail in the present description or illustrated in FIG. 1, since it is of known type and does not fall within the scope of the present invention. Furthermore, the elimination of these structural details from the drawing makes the latter more readily and easily understood.

Two lateral plates are indicated 4 and are connected in an orientable manner about a transverse shaft 5 which connects the two lateral structures 3 at the rear ends thereof. The plates 4 are connected to the structures 3 by means of a device for adjustment of the orientation of these plates, which may be of any known type. In this case also, therefore, the device is not shown in detail.

A sub-unit constituting the frame of the squab of the seat and a sub-unit constituting the frame of the backrest are indicated 6 and 7 respectively. The frame 6, which is constituted by a panel 7 in the embodiment illustrated, is connected by any known technique (for example, by means of welding, gluing, rivetting, or by releasable connection means) to the two lateral structures 3 constituting the main frame of the sub-unit 1. The sub-unit 7, which in the embodiment illustrated is constituted by a frame within which a panel 9 of elastic webbing is arranged, is connected to the two plates 4. The padding 10 of the squab and the padding 11 of the backrest are mounted on the frames 6 and 7 respectively, and are each constituted by a body of expanded plastics material provided with outer coverings 12, 13. These coverings are fixed to the paddings 10, 11 before assembly on the frames 6, 7.

In a preferred embodiment, the coverings 12, 13 are shaped in accordance with the shape required and are joined to the paddings 10, 11 by means of the method which is the subject of the European patent application No. EP-A-0 263 798 filed by the same Applicant.

According to a further preferred characteristic, the paddings 10, 11 are each provided with an auxiliary frame (not visible in the drawings) incorporated in the padding, for rapid connection to the respective support frame of the seat, for example, as described in the U.S. Pat. No. 4,746,168 by the same Applicant.

The modular structure described above provides various advantages. Each sub-unit is manufactured separately from the others, with the advantage of convenience and economy of manufacture. Furthermore, as already indicated above, it is possible to provide different mutually interchangeable variants of each sub-unit, to enable different seat models to be produced. For example, the sub-unit 1 may be provided with one or more seat-adjustment mechanisms, such as, for example, the device for adjustment of the height of the front edge and/or the rear edge of the seat, as well as various possible manual or motorised devices for operation of the various adjustment mechanisms. In its turn, the squab sub-unit may be provided with one or more adjustment mechanisms, such as the device for adjustment of the thigh support, the device for adjustment of the lateral thigh restraint and the respective manual or motorised control devices. The backrest unit may also be provided with one or more manual or motorised adjustment mechanisms, such as the device for adjustment of the lumbar support and the device for adjustment of the lateral restraint.

Figure 2:
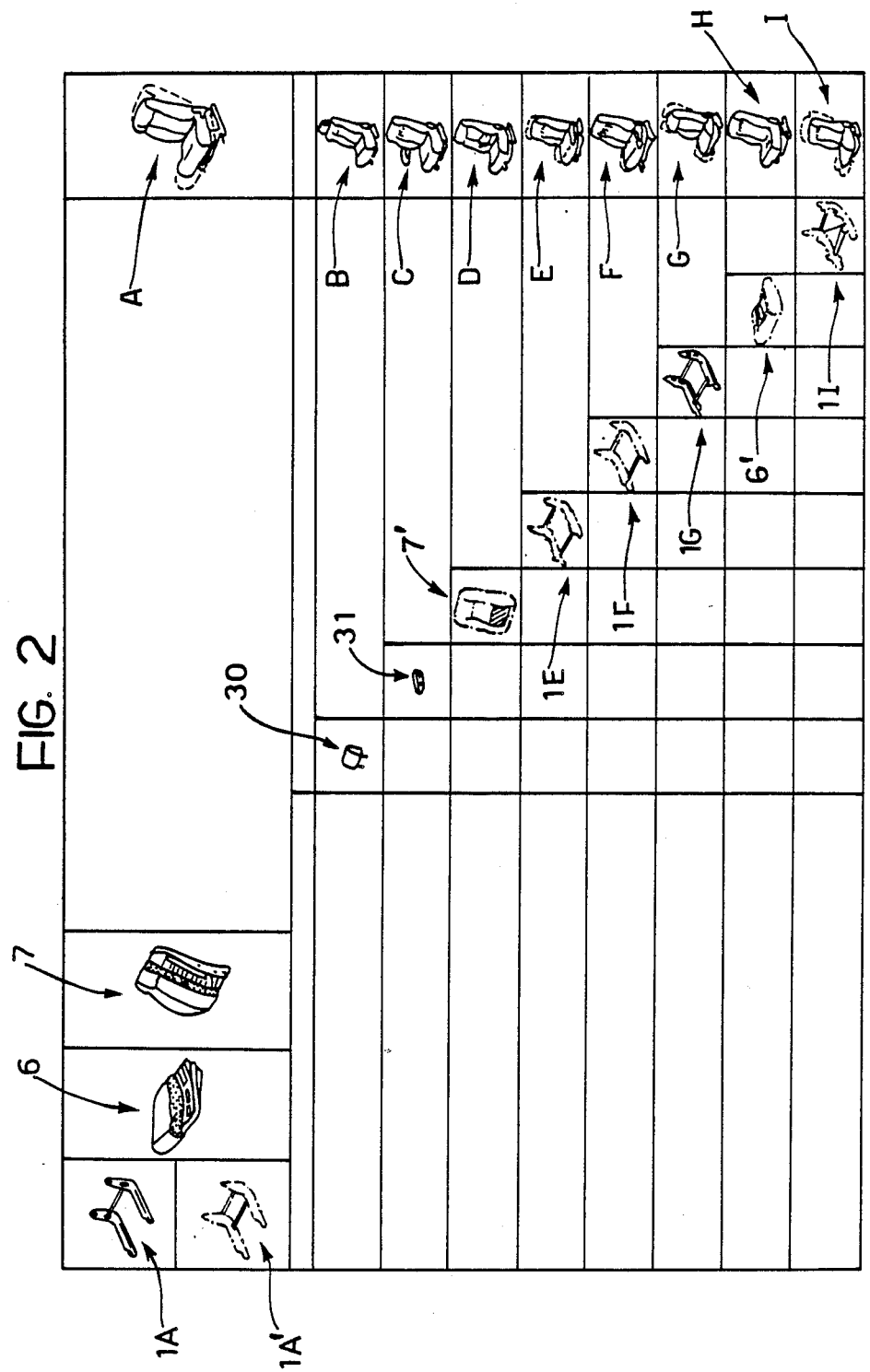
FIG. 2 is a diagram showing schematically the basic concept of the method according to the invention.

For each sub-unit, therefore, it is possible to provide different variants dependent upon the required performance. The connection means with which each variant is provided for its connection to the other sub-units of the seat are compatible with the connection means of any variant of each sub-unit. The different variants of the various sub-units can therefore be put together in all the possible combinations to produce a variety of seat models. An example of the application of this concept is shown in the diagram of FIG. 2. The extreme right-hand column of this diagram shows the basic version A of the seat, as well as a series of possible variants B (seat with head-rest), C (seat with arm-rest), D (seat with lumbar adjustment device , E (seat with adjustable squab height), F (seat with adjustable squab attitude), G (seat with motorised controls), H (seat with heated squab), I (seat with sensors for automatic computer control of the adjustments).

The above seat variants are obtainable by the combination of the squab sub-unit 6 and the backrest sub-unit 7 with one of the possible variants of the mechanical sub-unit 1. These variants include a first basic version 1A which incorporates only the longitudinal adjustment device and a device for adjustment of the backrest, a second basic version 1A' which also incorporates a device for forward tipping of the seat (to enable access to the rear seats in cars with only two side doors), and a series of further variants 1E, 1F, 1G and 1I. The variant 1E includes a mechanism for adjustment of the height of the squab; the variant 1F includes a mechanism for adjustment of the height of the front edge and/or the rear edge of the squab; the variant 1G is provided with motorised control; the variant 1I includes sensors for automatic computer control of the adjustments.

The basic model A of the seat results from assembly of the modules 6 and 7 with one of the two mechanical modules 1A and 1A'. The models E, F, G, I result from assembly of the.units 6 and 7 with the sub-units 1E, 1F, 1G and 1I. Finally, the models B and C result from the fixing to the seat of the head-rest 30 and an arm-rest 31, respectively. The model D results from replacement of the backrest unit 7 with a unit 7' including a lumbar adjustment device. The model H results from replacement of the squab unit 6 with a unit 6' including a squab-heating device.

I claim:

1. A method for the production of motor vehicle seats comprising:
    providing a plurality of different first seat sub-units having a main frame provided with a plurality of different seat adjustment mechanisms, each including at least a longitudinal guide device and a backrest adjustment device;
    providing a plurality of different second sub-units each including a squab frame and different adjustment mechanisms;
    providing a plurality of different third sub-units each including a backrest frame and different adjustment mechanisms;
    providing a plurality of different fourth and fifth sub-units constituted respectively by the padding adapted to be secured to said squab frame and said backrest frame and respective outer coverings for the padding;
    selecting a specific sub-unit from each of said first through fifth sub-units; and
    assembling the selected sub-units into a motor vehicle seat.

2. A method as set forth in claim 1, further comprising providing a plurality of seat attachments, selecting at least one seat attachment and assembling the selected seat attachment with a selected one of said sub-units.

3. A motor vehicle seat comprised of a plurality of interconnected modular sub-units including:
    a first seat sub-unit having a main frame provided with a plurality of seat adjustment mechanisms including longitudinal guide means and backrest adjustment means;
    a second sub-unit having a squab frame adapted to have squab adjustment means thereon;
    a third sub-unit having a backrest frame adapted to have adjustment means thereon; and
    fourth and fifth sub-units comprised of padding on the squab frame and backrest frame and outer coverings on said padding.

4. A seat according to claim 3, wherein said first sub-unit comprises a pair of guides adapted to be fixed to the floor of a motor vehicle, a pair of runners slidably mounted in said guides, a pair of lateral structures rigidly connected to the runners respectively and connected together by means of a transverse structure so as to define the main frame of the first sub-unit, said first sub-unit also including two lateral plates connected in an orientable manner to the rear ends of the lateral structrues respectively by means of said backrest adjustment device.

5. A seat according to claim 4, wherein said squab frame includes a rigid panel secured to said two lateral structures of said first sub-unit.

* * * * *